Feb. 13, 1940.  J. NEUFELD  2,190,039
NAVIGATIONAL METHOD AND APPARATUS
Filed July 29, 1937
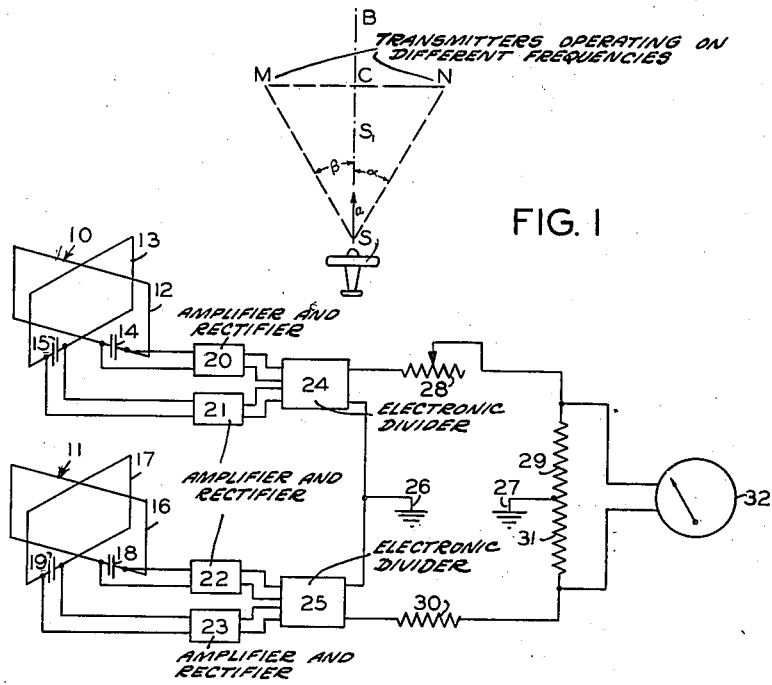
FIG. 1
FIG. 2
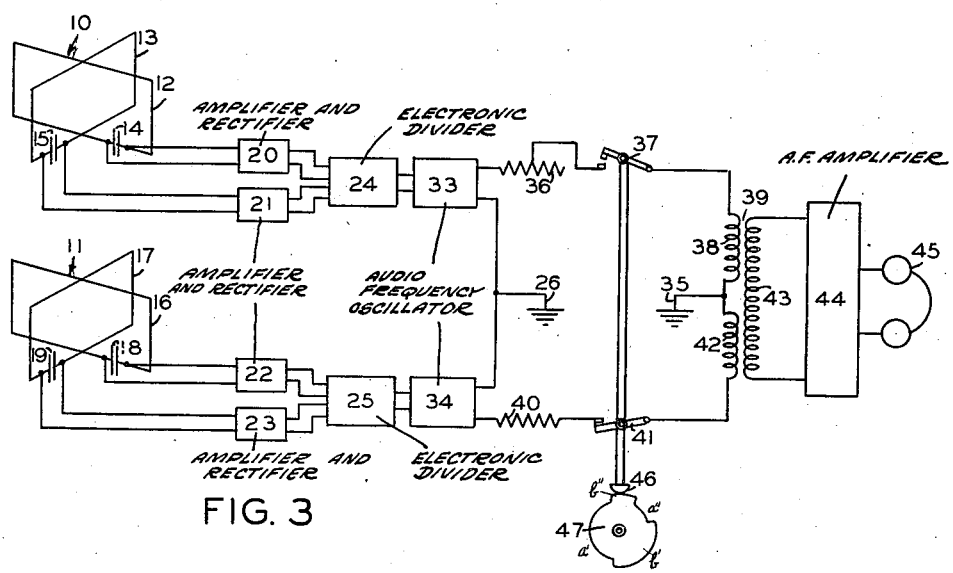
FIG. 3
INVENTOR
Jacob Neufeld Patented Feb. 13, 1940

2,190,039

UNITED STATES PATENT OFFICE 2,190,039

NAVIGATIONAL METHOD AND APPARATUS

Jacob Neufeld, Tulsa, Okla.

Application July 29, 1937, Serial No. 156,378

10 Claims. (Cl. 250—11)

My invention relates to direction finding systems and more particularly to improved direction finding means for use on mobile craft, such as ships, airplanes, etc., whereby a response in accordance with a route to be followed may be obtained.

The need for an accurate marking of the principal air routes of the country has been well met by the installation of radio range beacons. Their operation over a number of years shows definitely that they are satisfactorily devised for aiding aircraft. The limitation, however, is that they may only be used on the particular air routes for which they were installed. The itinerant pilot cannot always use them. Thus there is a need for a direction finder with which the pilot may be guided over territories in which radio range beacons are not available. It is well known, however, that the direction finders, which are in use at the present time do not permit the aircraft to fly the most direct route in case of cross winds. Under such conditions the plane will follow a curved path, the deviation from a straight line depending on the velocity of the cross wind. This is not true with the radio range beacon, where a true straight course can be flown.

It is another object of my invention to avoid the necessity for marking out the course as by means of a radio beacon system and to provide an arrangement in which the course to be traveled by a mobile craft, is predetermined by adjustment of the equipment on the craft itself.

It is another object of my invention to provide a direction finder of the type described above and in which aural and visual means will be provided for indicating to the pilot whether or not a predetermined course is flown.

The novel features which I believe to be characteristic of my invention are set forth with particularity in the appended claims. My invention itself, however, both as to its organization and method of operation, together with further objects and advantages thereof, will be understood best by reference to the following description taken in connection with the accompanying drawing in which:

Figure 1 shows diagrammatically the territory over which the airplane is flying.

Figure 2 shows an embodiment of my invention in which visual indication of the "on course" conditions is provided.

Figure 3 shows another embodiment of my invention in which aural indication of the "on course" conditions is provided.

The present invention makes use of two fixed reference points conveniently distant one from another and at which transmitting apparatus generating signals at different frequencies are located. Two receivers are located in the craft and are respectively tuned to the referred to frequencies. Each of the receivers is provided with a directional antenna arrangement and is adapted to give angular indication of the aircraft course with regard to both reference points. It is evident now that by means of said angular indications and with the use of a suitable signal intensity comparing and indicating means, the plane may be steered or guided along a definite course even in foggy weather. Thus if the course to be followed is in fact the line of equal angular deviations of the course to be followed with regard to the direction of each of the two reference stations, the signal intensity comparing device or indicator shows the receipt of equal intensity signals from the two receivers.

If the course to be followed is a curve corresponding to a certain predetermined relationship between the two angular indications, the signal receiving and comparing device will show whether the said predetermined relationship exists and consequently whether the predetermined route is followed.

Thus my invention utilizes electro-magnetic waves transmitted from spaced stations of known positions for geographically locating positions of a plurality of predetermined courses with respect to the surface of the earth.

My invention will be better understood in connection with Figure 1 in which S designates an airplane flying according to a predetermined course in the direction indicated by the arrow $a$, M, and N designate two radio-transmitting stations operating on different frequencies, $\alpha$ is the angle between the direction of the course (indicated by the arrow $a$) and the direction SN at which the station N is located and $\beta$ is the angle between the direction of the course $a$ and the direction SM at which the station M is located.

Assume that the course of the airplane consists of the straight line SB perpendicular to the segment MN and passing through its midpoint C. For any position on the course such as at $S_1$, the angles $\alpha$ are correspondingly equal to the angles $\beta$. Thus the correctness of the airplane course can be determined by observing the quality between the angles $\alpha$ and $\beta$, i. e., between the direction of the course and the directions of the stations N and M respectively.

It is apparent that the line SB constitutes a locus of points such as S, S₁, etc., satisfying the relation $\alpha = \beta$.

It is also apparent that loci of points satisfying certain predetermined angular relationships other than $\alpha = \beta$ may be represented by means of corresponding curves. Thus, curves may be drawn representing loci corresponding to $\alpha = n\beta$ wherein $n$ has the value ½, 2, 3, etc. respectively. Each of the said curves may be chosen for an airplane course by observing the equality between the values $\alpha$ and $n\beta$.

In accordance with the present invention the equality between the angular values $\alpha$ and $n\beta$ (where $n$ may be any predetermined number, fractional or an integer) may be observed either visually or aurally.

In particular, Figure 2 shows a means for observing visually the above angular relationships. In this figure the numerals 10 and 11 denote two aerials, the aerial 10 comprising two loops, 12 and 13 angularly displaced with respect to each other and tuned by means of condensers 14 and 15 respectively, and the aerial 11 comprising loops 16, 17 tuned by means of condensers 18, 19, respectively. The outputs of the antennae 12, 13, 16, 17 are connected to amplifier-rectifiers 20, 21, 22, 23 respectively. The amplifier-rectifiers 20, 21 are in turn connected to an electronic divider 24 and the amplifier-rectifiers 22, 23 are connected to an electronic divider 25. The electronic dividers 24 and 25 may be of the type described in my U. S. Patent 2,129,880.

One of the output terminals of the electronic divider 24 is connected to the ground 26 directly and the other output terminal is connected to the ground 27 through a variable resistor 28 and a resistor 29. In a similar manner one of the output terminals of the electronic divider 25 is connected to the ground 26 directly and the other output terminal is connected to the ground 27 through a resistor 30 and a resistor 31. The resistors 29, 31 possess the common ground terminal 27 and have other two terminals connected to a voltmeter 32.

Assume now that the aerial 10 has been tuned by means of condensers 14, 15 to the station N and the aerial 11 has been tuned by means of condensers 18, 19 to the station M. The signals derived from the antennae 12, 13 are amplified and rectified in 20, 21 respectively and applied to the electronic divider 24. Across the output terminals of the electronic divider there appears a voltage representing the angular deviation $\alpha$ between the course of the plane and the direction of the station N.

In a similar manner across the output terminals of the electronic divider 25 there appears a voltage representing the angular deviation $\beta$ between the course of the plane and the direction of the station M.

A detailed explanation of the manner in which the voltage representing the angular value $\alpha$ or $\beta$ is produced can be found in another specification of the applicant, relating to an improvement in Position and direction determining system, Serial #150,286 filed June 25, 1937.

It is apparent that the relative intensity of the two electrical voltages representing $\alpha$ and $\beta$ respectively depends upon the orientation of the airplane course with regard to the stations M and N. When the airplane course coincides with the direction $a$ the two voltages representing the angles $\alpha$ and $\beta$ are equal. Assume that the resistance 28 is equal to the resistance 30. Then the current flowing through the resistor 28 in series with the resistor 29 and derived from 24 is equal to the current flowing through the resistor 30 in series with the resistor 31 and derived from 25. These currents produce equal voltage drops across the resistors 29, 31, these voltage drops being applied in opposition in such a manner that their effects cancel each other and the voltage applied to the meter 32 is zero. Consequently when the airplane is on course no currents flow through the instrument 32 and the indication is zero.

Now assume that the plane has deviated from its predetermined course and at a given point S it is directed so that $\beta > \alpha$. Then the voltage across the output terminals of the electronic divider 25 is larger than the voltage across the output terminals of the electronic divider 24. These voltages do not cancel any longer and their difference applied across the resistors 29, 31 causes a current to flow and to produce a corresponding deflection of the indicating instrument 32.

On the other hand if the deviation of the plane is such that $\beta < \alpha$ the deflection of the indicating instrument will be in the opposite direction.

It will also be observed that the installation may be so arranged that when the plane is flying toward the transmitting stations M, N but is off course by an angle to the right of the course, the indicating needle on the instrument will be deflected toward the left so that the pilot will understand that he must turn the plane to the left in order to bring the plane back to its true course. With this original arrangement, it therefore follows, that if the plane is flying away from the station and is angled to the left of its course, the indicating instrument will point to the left so that if the pilot follows the normal operation of swinging the plane to the left to bring it back to its course, the indicating instrument 32 will swing further to the left instead of returning to its neutral position.

Hence, my direction indicating device is adaptable not only to indicate whether the pilot is on a desired course or not but is also adapted to indicate to the pilot whether he is flying towards or away from the transmitting stations M and N.

In guiding moving craft along a predetermined course, it is very desirable to provide an aural indication instead of the visual indication, or in addition to the visual indication. Such an aural indication may consist of impulses forming the letter A if the airplane deviates in one direction or the letter N if the airplane deviates in the other direction. On the course, these impulses of the letters combine to form a continuous sound.

Such a system, providing an aural indication is shown diagrammatically in Figure 3, wherein numerals 10 and 11 denote two aerials, the aerial 10 comprising two loops 12 and 13 angularly displaced with respect to each other and tuned by means of condensers 14, 15 respectively and the aerial 11, comprising loops 16, 17 tuned by means of condensers 18, 19 respectively.

The outputs of the antennae 12, 13, 16, 17 are connected to amplifier-rectifiers 20, 21, 22, 23 respectively. The amplifier-rectifiers 20, 21 are in turn connected to an electronic divider 24 and the amplifier-rectifiers 22, 23 are connected to an electronic divider 25. The electronic dividers 24 and 25 are subsequently connected to audio frequency oscillators 33 and 34 respectively.

One of the output terminals of the oscillator 33 is connected to the ground 26 directly and the other output terminal is connected to the ground 35 through a variable resistor 36, switch 37 and the primary winding 38 of a transformer 39. In a similar manner one of the output terminals of the oscillator 34 is connected to the ground 26 directly and the other output terminal is connected to the ground 35 through a fixed resistor 40, switch 41 and the primary winding 42 of the transformer 39.

The secondary winding 43 of the transformer 39 is connected to an amplifier 44 and the output terminals of the amplifier are connected to a telephone receiver 45.

A switching arrangement is provided for alternately connecting and disconnecting the switches 37 and 41. This arrangement contains a cam follower 46, which rides upon a rotary cam 47. The cam 47 may be of any desired shape but in the instance shown is of such a shape that impulses forming the letters A and N are transmitted to the receiver 45.

Assume now that the aerial 10 has been tuned by means of condensers 14, 15 to the station N and the aerial 11 has ben tuned by means of condensers 18, 19 to the station M. The signals delivered from the antennae 12, 13 are amplified and rectified in 20, 21 respectively and applied to the electronic divider 24. Across the output terminals of the electronic divider 24 there appears a D. C. voltage representing the angular deviation $\alpha$ between the course of the plane and the direction of the station N. In a similar manner across the output terminals of the electronic divider 25 there appears a D. C. voltage representing the angular deviation $\beta$ between the course of the plane and the direction of the station M. The output voltages of the electronic dividers 24 and 25 are applied to the audio oscillators 33 and 34 respectively and modulate their respective currents. Thus across the output terminals of 33 and 34 there appear voltages of audio frequency, the amplitude of which is modulated by the signals derived from 24 and 25, the said signals being respectively proportional to the values $\alpha$ and $\beta$.

It is apparent that the relative intensity of the two electrical signals derived from 24 and 25 respectively depend upon the orientation of the airplane course with regard to the stations M and N. When the airplane course coincides with the direction $a$ the two sets of voltages representing the angles $\alpha$ and $\beta$ are equal. Then the output voltage of 33 is transmitted intermittently to the primary 38 of the transformer 39. In a similar manner the output voltage of 34 is transmitted intermittently to the primary 42 of the transformer 39. The intermittent effects of transmission of the signals $\alpha$ and $\beta$ is caused by the switching system in which the switches 37, 41 are controlled by the cam follower 46, which rides upon the rotary cam 47. The cam 47 is of such a shape that impulses forming the letters A and N (in Morse's alphabet) are transmitted intermittently from the oscillators 33, 34 to the primaries 38, 42 respectively of the transformer 39. The impulses corresponding to N are obtained when the cam follower 46 is riding upon the portions $a'$ and $a''$ of the cam 47. It is apparent that the intensity of the "A" impulses depends upon the magnitude of the output voltage of the electronic divider 24 and that this output voltage depends upon $\alpha$. In a similar manner the impulses corresponding to A are obtained when the cam follower 46 is riding upon the portions $b'$ and $b''$ of the cam 47. It is apparent that the intensity of the "N" impulses depends upon the magnitude of the output voltage of the electronic divider 25 and that this output voltage depends upon $\beta$.

The signals A and N are subsequently transmitted through the transformer 39, amplified in 44 and applied to the earphones 45.

When the craft upon which the receiver is mounted is exactly upon the course indicated by the arrow $a$ in Fig. 1, the angle $\beta$ representing the direction of the station M is equal to the angle $\alpha$ representing the direction of the station N. Then the output current of 33 which is continually interrupted by the switch 37 according to the signal "N" is equal to the output current of 34 which is continually interrupted by the switch 41 according to the signal "A". Then equal signals of the form "A" and "N" are received and these signals produce a continuous sound in the headphones 44. If, however, a craft upon which the receiver is mounted deviates towards the station M, the current controlled by the switch 37 and representing the angle $\alpha$ becomes larger than the current controlled by the switch 41 and representing the angle $\beta$. Then the impulses such as formed by "A" will predominate in the headphones 44. On the other hand, if the craft deviates towards the station N, the current controlled by the switch 41 and representing the angle $\beta$ becomes larger than the current interrupted by the switch 37 and representing the angle $\alpha$. Then the impulses that dominate in the headphones 44 are of the form "N".

It is therefore apparent that I have provided a method for guiding an airplane along a line of equal angular deviations of the course to be followed with regard to the direction of each of the two reference stations, the said two reference stations being indicated by M and N in Figure 1 and the angular relationships involved being expressed by the equality $\alpha = \beta$.

If the course to be followed is not any longer the line corresponding to the relation $\alpha = \beta$ but a curve corresponding to a certain predetermined relationship between the two angular indications such as for instance: $\alpha = n\beta$, then certain modification should be introduced. Namely for the correct alignment of the airplane course the voltage between the output terminals of the electronic divider 24 should be $n$ times larger than the voltage across the output terminals of the electronic divider 25. Then for the proper balancing of voltages across the resistors 29 and 31 respectively and for producing a zero indication in the voltmeter 32 it is necessary that the resistor 28 should be made correspondingly larger than the resistor 30. (See Figure 2.) Let $r_{28}$ be the resistance of 28, $r_{30}$ be the resistance of 30 and $r$ be the resistance of 29 or of 31. Then if $(r_{28}+r) = (r_{30}+r)xn$ the currents flowing through the resistors 29 and 31 are equal and the voltage drops across these resistors are also equal. Since these two voltage drops are in opposition the resultant voltage applied to the indicator 32 is zero and the "on course" condition is satisfied. A little consideration will show that if the airplane deviates from its course to the left the current passing through the course indicator 32 in one direction will be greater than in the reverse direction. The course indicator may therefore be so connected that its pointer will deflect to the left. Now if the airplane deviates to the right of its course, the course indicator pointer will obviously deflect to the right. This direction finder therefore gives the pilot not only an indication of the course but also sense of deviation of the line of flight of the airplane from this course.

It is therefore apparent that by changing properly the resistor 28 in the arrangement of Figure 2 the zero indication of the course indicator 32 can be made to correspond to any desired angular relationship of the type $\alpha = n\beta$.

Consider now the arrangement of Figure 3 and assume that the course to be followed corresponds to the relation $\alpha = n\beta$. Then for the proper alignment of the course the output of 24 should be $n$ times larger than the output of 25. Then in order to have the intensities of the interlocked A and N signals respectively equal one to another it is necessary that the resistor 36 should be made correspondingly larger than the resistor 40.

In view of my invention and disclosure, variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

I claim:

1. In a system for comparing directions of two radio-transmitting stations, the said stations being spaced one from the other and transmitting waves at different frequencies, two absorbing means for selectively receiving the transmitted waves at different frequencies from the said transmitting stations, means for producing two electrical signals, the magnitude of each of the said signals representing individually the direction of a corresponding transmitting station, means for combining the said electrical signals in a sense to compare their respective magnitudes and means for producing an indication of their relative magnitudes.

2. The method of controlling the motion of a craft with reference to directions at which radio-transmitting stations are located, the said stations being spaced one from the other and transmitting waves at different frequencies, comprising the step of selectively receiving the said waves and producing electrical currents, the magnitude of each of the said currents representing individually the direction of a corresponding wave, combining the said currents into a resultant current, the said resultant current representing a determined relationship between the magnitudes of the said direction representing currents, and constraining the motion along a path which corresponds to a predetermined character of the said resultant current, the said predetermined character corresponding to a line predetermined in space.

3. In the method of controlling the position of a craft with reference to directions at which radio-transmitting stations are located, the said stations being spaced one from the other and transmitting waves at different frequencies, the step of selectively receiving the said waves producing electrical signals, the magnitude of said signals representing said directions respectively, the step of translating said signals at intervals of different character, and the step of producing distinctive aural responses representing relative magnitudes of said signals.

4. The method of controlling the position of a craft with reference to two directions at which two radio-transmitting stations are respectively located, the said stations being spaced one from the other and transmitting waves at different frequencies, comprising the step of selectively receiving the said waves and producing two electrical signals, the magnitude of the said signals representing individually the said directions, translating said signals at intervals of different character and producing a distinctive aural signal representing relative intensities of the said signals and constraining the motion along a path at which the said aural signal remains constant, the said path corresponding to a line predetermined in space.

5. In an arrangement for guiding a craft in space, a plurality of radio-transmitting stations established on ground in different geographical locations, the said stations transmitting waves at different frequencies, an apparatus on said craft, the said apparatus comprising means for selectively receiving the said waves and producing electrical currents, the magnitude of each of the said currents representing individually the direction of one of the said transmitting stations, means for combining the said currents into a resultant current, the said resultant current indicating the relative magnitudes of the first said electrical currents, the said relative magnitudes determining the position of the craft with respect to the said transmitting stations.

6. In an arrangement for guiding a craft in space, a plurality of radio-transmitting stations established on ground in different geographical locations, the said stations transmitting waves at different frequencies, an apparatus on said craft, the said apparatus comprising means for selectively receiving the said waves and producing electrical currents, the magnitudes of said currents representing individually directions of the said transmitting stations, means for translating the said currents at intervals of different character and producing distinctive aural responses representing the relative magnitudes of the said currents, the said relative magnitudes determining the position of the craft.

7. In a system for guiding a craft in space, a plurality of radio-transmitting stations arranged in different geographical locations, the said stations transmitting waves at different frequencies, the said waves extending over a common region including said space, a plurality of receiving means on said craft, each of said receiving means being responsive to the distinctive frequency received from one of the transmitting stations to produce an indication of the direction of the said station, and means responsive to the said indications for producing an aural signal representing a determined relationship between the directions of the said stations.

8. In a system for guiding moving craft in a certain geographical area, a plurality of radiating systems arranged at different geographical locations in said area and radiating waves at different frequencies, means on the craft directionally sensitive to energy received and selectively responsive to the said frequencies to produce an aural signal representing relative position of the craft with respect to the said radiating systems, the said aural signal being adapted to vary with the said position.

9. In a system of comparing directions of radio transmitting stations with respect to the course of a craft, the said stations being spaced one from the other and transmitting signals at different frequencies, absorbing means for directionally and selectively receiving the transmitted signals at different frequencies from the said transmitting stations, means for producing electrical currents indicating individually the directions of the said transmitting stations, means for translating the said currents during intervals of different character and signalling means for producing aural responses dependent upon the course of the craft.

10. In the method of controlling the position of a craft with reference to directions at which radio transmitting stations are located, the said stations being spaced one from the other and transmitting waves at different frequencies, the step of selectively receiving the said waves and producing electrical signals, the magnitude of said signals representing said directions respectively, the step of interrupting said signals at intervals of different character and producing distinctive aural responses representing the relative magnitudes of said signals.

JACOB NEUFELD.